(12) United States Patent
Peng et al.

(10) Patent No.: US 10,341,939 B2
(45) Date of Patent: Jul. 2, 2019

(54) METHOD FOR IDENTIFYING WIRELESS AP, SERVER, SYSTEM, AND COMPUTER STORAGE MEDIUM

(71) Applicant: Tencent Technology (Shenzhen) Company Limited, Shenzhen (CN)

(72) Inventors: Yuanquan Peng, Shenzhen (CN); Shengrong Chen, Shenzhen (CN); Xiaodong Ou, Shenzhen (CN); Shuang Wang, Shenzhen (CN); Haifeng Ding, Shenzhen (CN); Qianliang Yang, Shenzhen (CN); Hanjie Xu, Shenzhen (CN)

(73) Assignee: TENCENT TECHNOLOGY (SHENZHEN) COMPANY LIMIUTED, Shenzhen, Guangdong Provicne (CN)

( * ) Notice: Subject to any disclaimer, the term of this patent is extended or adjusted under 35 U.S.C. 154(b) by 0 days.

(21) Appl. No.: 15/709,799

(22) Filed: Sep. 20, 2017

(65) Prior Publication Data
US 2018/0014243 A1 Jan. 11, 2018

Related U.S. Application Data

(63) Continuation-in-part of application No. PCT/CN2016/081339, filed on May 6, 2016, and a
(Continued)

(30) Foreign Application Priority Data

Jul. 8, 2015 (CN) .......................... 2015 1 0396764
Jul. 24, 2015 (CN) .......................... 2015 1 0444295
Sep. 28, 2015 (CN) .......................... 2015 1 0631407

(51) Int. Cl.
*H04W 48/08* (2009.01)
*H04W 76/10* (2018.01)
(Continued)

(52) U.S. Cl.
CPC ......... *H04W 48/08* (2013.01); *H04L 43/0811* (2013.01); *H04W 48/20* (2013.01);
(Continued)

(58) Field of Classification Search
CPC combination set(s) only.
See application file for complete search history.

(56) References Cited

U.S. PATENT DOCUMENTS 8,489,072 B1  7/2013  Ding
9,258,770 B2 *  2/2016  Wuellner .............. H04W 48/20
(Continued)

FOREIGN PATENT DOCUMENTS

CN  102595407 A  7/2012
CN  102869073 A  1/2013
(Continued)

OTHER PUBLICATIONS

Tencent Technology, Written Opinion, PCT/CN2016/083999, dated Jul. 22, 2016, 6 pgs.
(Continued)

*Primary Examiner* — Jenee Holland
(74) *Attorney, Agent, or Firm* — Morgan, Lewis & Bockius LLP

(57) ABSTRACT

The present disclosure discloses a method for identifying a wireless AP performed at a server. The method includes: obtaining network connection information of terminal devices; for each terminal device, determining a rank for each respective wireless AP to which the terminal device connects by: analyzing corresponding network connection information to determine a first number of times of connections between the terminal device and the wireless AP; analyzing corresponding network connection information to determine a second number of times of connections between the wireless AP and each terminal device connecting to the
(Continued)

wireless AP; and determining the rank for the wireless AP based on a weighted average of the first number of times of connections and the second number of times of connections; and returning identifier information of wireless APs as a first-type wireless AP to which the terminal device connects and their corresponding ranks to the terminal device.

20 Claims, 11 Drawing Sheets

Related U.S. Application Data continuation-in-part of application No. PCT/CN2016/083019, filed on May 23, 2016, and a continuation-in-part of application No. PCT/CN2016/083999, filed on May 31, 2016.

(51) Int. Cl.
*H04L 12/26* (2006.01)
*H04W 48/20* (2009.01)
*H04W 72/06* (2009.01)
*H04W 48/16* (2009.01)
*H04W 88/02* (2009.01)
*H04W 88/08* (2009.01)

(52) U.S. Cl.
CPC ......... *H04W 72/06* (2013.01); *H04W 76/10* (2018.02); *H04W 48/16* (2013.01); *H04W 88/02* (2013.01); *H04W 88/08* (2013.01)

(56) References Cited

U.S. PATENT DOCUMENTS

| | | | | |
|---|---|---|---|---|
| 9,521,648 | B1* | 12/2016 | Kolekar | H04W 64/00 |
| 9,807,646 | B1* | 10/2017 | Jorgavanovic | H04L 1/00 |
| 2007/0115883 | A1* | 5/2007 | Narayanan | H04W 36/0011 |
| | | | | 370/331 |
| 2007/0249344 | A1* | 10/2007 | Hosono | H04W 36/00835 |
| | | | | 455/435.1 |
| 2009/0279429 | A1* | 11/2009 | Griffoul | H04L 29/08846 |
| | | | | 370/230 |
| 2012/0243460 | A1* | 9/2012 | Muto | H04L 45/22 |
| | | | | 370/315 |
| 2013/0013682 | A1* | 1/2013 | Juan | G06Q 50/01 |
| | | | | 709/204 |
| 2013/0227120 | A1* | 8/2013 | Yu | H04W 24/00 |
| | | | | 709/224 |
| 2013/0232555 | A1* | 9/2013 | Zhang | H04W 12/08 |
| | | | | 726/4 |
| 2014/0036705 | A1* | 2/2014 | Ma | H04W 28/0231 |
| | | | | 370/252 |
| 2015/0043528 | A1* | 2/2015 | Salkintzis | H04W 76/18 |
| | | | | 370/331 |
| 2015/0110087 | A1* | 4/2015 | Salkintzis | H04W 48/20 |
| | | | | 370/338 |
| 2015/0213022 | A1* | 7/2015 | Agarwal | G06F 16/24578 |
| | | | | 707/731 |
| 2015/0222527 | A1* | 8/2015 | Shah | H04L 45/3065 |
| | | | | 370/338 |
| 2015/0341211 | A1* | 11/2015 | Saha | H04L 41/0823 |
| | | | | 709/221 |
| 2017/0353905 | A1* | 12/2017 | Kumar | H04W 36/32 |
| 2018/0205749 | A1* | 7/2018 | Nandha Premnath | H04L 63/1416 |

FOREIGN PATENT DOCUMENTS

| | | |
|---|---|---|
| CN | 103533670 A | 1/2014 |
| CN | 103973501 A | 8/2014 |
| CN | 104301956 A | 1/2015 |
| CN | 104394263 A | 3/2015 |
| CN | 104581887 A | 4/2015 |
| CN | 104601262 A | 5/2015 |
| CN | 104618873 A | 5/2015 |
| CN | 104618991 A | 5/2015 |
| CN | 104717610 A | 6/2015 |
| CN | 104834855 A | 8/2015 |
| WO | WO 2012/155233 A1 | 11/2012 |

OTHER PUBLICATIONS

Tencent Technology, IPRP, PCT/CN2016/083999, Apr. 3, 2018, 7 pgs.
Tencent Technology, Written Opinion, PCT/CN2016/083019, dated Aug. 17, 2016, 7 pgs.
Tencent Technology, IPRP PCT/CN2016/083019, Jan. 30, 2018, 8 pgs.
Tencent Technology, IPRP, PCT/CN2016/081339, Jan. 9, 2018, 7 pgs.
Tencent Technology, ISR, PCT/CN2016/083999, Jul. 22, 2016, 2 pgs.
Tencent Technology, ISR, PCT/CN2016/083019, Aug. 17, 2016, 3 pgs.
Tencent Technology, ISRWO, PCT/CN2016/081339, Jul. 22, 2016, 8 pgs.

* cited by examiner

```
                                                61
                                              /
        ┌────────────────────────────────────────────┐
        │ Obtain network connection information of a terminal device │
        └────────────────────────────────────────────┘
                            │        62
                            ▼       /
        ┌────────────────────────────────────────────┐
        │ Obtain corresponding network connection information based on
          identifier information of the terminal device, to obtain a first
          number of times of connections between the terminal device and
          each wireless AP to which the terminal device connects │
        └────────────────────────────────────────────┘
                            │        63
                            ▼       /
        ┌────────────────────────────────────────────┐
        │ Obtain corresponding network connection information based on
          identifier information of a wireless AP, to obtain a second number
          of times of connections between the wireless AP and each terminal
          device connecting to the wireless AP │
        └────────────────────────────────────────────┘
                            │        64
                            ▼       /
        ┌────────────────────────────────────────────┐
        │ Determine, based on the first number of times of connections, a
          ranking of a first number of times of connections of at least one
          wireless AP to which the terminal device connects; and determine,
          based on the second number of times of connections, a ranking of a
          second number of times of connections of at least one terminal
          device connecting to the wireless AP │
        └────────────────────────────────────────────┘
                            │        65
                            ▼       /
        ┌────────────────────────────────────────────┐
        │ Select, based on the ranking of the first number of times of
          connections, N wireless APs whose rankings of numbers of times
          of connections to the terminal device are the highest │
        └────────────────────────────────────────────┘
                            │        66
                            ▼       /
        ┌────────────────────────────────────────────┐
        │ Obtain rankings of reference numbers of times of connections to
          the terminal device from rankings of N second numbers,
          corresponding to the N wireless APs, of times of connections │
        └────────────────────────────────────────────┘
                            │        67
                            ▼       /
        ┌────────────────────────────────────────────┐
        │ Select M wireless APs whose rankings of numbers of times of
          connections are the highest │
        └────────────────────────────────────────────┘
                            │        68
                            ▼       /
        ┌────────────────────────────────────────────┐
        │ Set, as the first-type wireless AP based on the time period that is in
          the network connection information and in which the terminal
          device establishes a connection to the AP, a wireless AP of the M
          wireless APs that meets a second preset condition │
        └────────────────────────────────────────────┘
```

METHOD FOR IDENTIFYING WIRELESS AP, SERVER, SYSTEM, AND COMPUTER STORAGE MEDIUM

RELATED APPLICATIONS

This application is a continuation-in-part of (i) PCT/CN2016/081339, entitled "WIRELESS ACCESS POINT IDENTIFICATION METHOD, SERVER, SYSTEM AND COMPUTER STORAGE MEDIUM" filed on May 6, 2016, which claims priority to Chinese Patent Application No. 201510396764.1, filed with the State Intellectual Property Office of the People's Republic of China on Jul. 8, 2015, and entitled "WIRELESS ACCESS POINT IDENTIFICATION METHOD, SERVER, SYSTEM AND COMPUTER STORAGE MEDIUM", (ii) PCT/CN2016/083019, entitled "WIRELESS NETWORK CONNECTION METHOD AND WIRELESS NETWORK CONNECTION DEVICE" filed on May 23, 2016, which claims priority to Chinese Patent Application No. 201510444295.6, filed with the State Intellectual Property Office of the People's Republic of China on Jul. 24, 2015, and entitled "WIRELESS NETWORK CONNECTION METHOD AND WIRELESS NETWORK CONNECTION DEVICE", and (iii) PCT/CN2016/083999, entitled "METHOD FOR CONNECTING TO WIRELESS ACCESS POINT, TERMINAL, SERVER, AND NONVOLATILE COMPUTER READABLE STORAGE MEDIUM" filed on May 31, 2016, which claims priority to Chinese Patent Application No. 201510631407.9, filed with the State Intellectual Property Office of the People's Republic of China on Sep. 28, 2015, and entitled "METHOD AND APPARATUS FOR CONNECTING TO WIRELESS ACCESS POINT", all of which are incorporated herein by reference in their entirety.

FIELD OF THE TECHNOLOGY

The present disclosure relates to network management technologies in the information processing field, and in particular, to a method for identifying a wireless AP, a server, a system, and a computer storage medium.

BACKGROUND OF THE DISCLOSURE

A user can access a wireless AP by using a terminal device, so as to access a network by accessing the wireless AP. Therefore, the user obtains required information from the network. Currently, wireless APs are used more widely, and a plurality of wireless APs of different types may be accessed in a company, in a mall, and at home. A method for determining a type of a wireless AP accessed by a terminal device is usually determining the type according to a time of accessing a network. However, a type of a used wireless AP is determined according to a time of accessing a network. In this case, a problem of inaccurate type identification caused by that some users use an on-duty time and an off-duty time that are different from a preset time rule is avoided.

SUMMARY

In view of this, an objective of embodiments of the present disclosure is to provide a method for identifying a wireless AP, a server, a system, and a computer storage medium, to resolve at least the foregoing problem in the existing technology.

An embodiment of the present disclosure provides a method for identifying a wireless AP, applied to a server, including:

obtaining network connection information of a terminal device, the network connection information including at least identifier information of the terminal device and identifier information of a respective wireless AP to which the terminal device connects;

analyzing corresponding network connection information based on the identifier information of the terminal device, to determine a first number of times of connections between the terminal device and the wireless AP to which the terminal device connects;

analyzing corresponding network connection information based on the identifier information of the wireless AP, to determine a second number of times of connections between the wireless AP and each terminal device connecting to the wireless AP; and identifying a first-type wireless AP based on the first number of times of connections and/or the second number of times of connections.

An embodiment of the present disclosure provides a server, including:

an information obtaining unit, configured to obtain network connection information of a terminal device, the network connection information including at least identifier information of the terminal device and identifier information of a respective wireless AP to which the terminal device connects;

a processing unit, configured to: obtain corresponding network connection information based on the identifier information of the terminal device, to determine a first number of times of connections between the terminal device and the wireless AP to which the terminal device connects; and obtain corresponding network connection information based on the identifier information of the wireless AP, to determine a second number of times of connections between the wireless AP and each terminal device connecting to the wireless AP; and an identification unit, configured to identify a first-type wireless AP based on the first number of times of connections and/or the second number of times of connections.

An embodiment of the present disclosure provides a system for identifying a wireless AP, the system including:

a server, configured to: obtain network connection information of a terminal device, the network connection information including at least identifier information of the terminal device and identifier information of a respective wireless AP to which the terminal device connects; obtain corresponding network connection information based on the identifier information of the terminal device, to determine a first number of times of connections between the terminal device and the wireless AP to which the terminal device connects; obtain corresponding network connection information based on the identifier information of the wireless AP, to determine a second number of times of connections between the wireless AP and each terminal device connecting to the wireless AP; and identify a first-type wireless AP based on the first number of times of connections and/or the second number of times of connections; and the terminal device, configured to: establish a connection to the wireless AP; generate network connection information based on the identifier information of the terminal device and the identifier information of the wireless AP to which the terminal device connects; and send the network connection information to the server.

An embodiment of the present disclosure provides a computer storage medium, storing computer executable instructions, the computer executable instructions being used to perform at least the following processing:

obtaining network connection information of a terminal device, the network connection information including at least identifier information of the terminal device and identifier information of a respective wireless AP to which the terminal device connects; analyzing corresponding network connection information based on the identifier information of the terminal device, to determine a first number of times of connections between the terminal device and the wireless AP to which the terminal device connects; analyzing corresponding network connection information based on the identifier information of the wireless AP, to determine a second number of times of connections between the wireless AP and each terminal device connecting to the wireless AP; and identifying a first-type wireless AP based on the first number of times of connections and/or the second number of times of connections.

For the method for identifying a wireless AP, a server, a system, and a computer storage medium that are provided in the embodiments of the present disclosure, a first number of times of connections between a terminal device and a wireless AP and a second number of times of connections established between a wireless AP and a terminal device are separately determined according to network connection information reported by the terminal device, and a first-type wireless AP is identified according to the first number of times of connections and the second number of times of connections. In this way, impact of a time rule can be avoided, and accuracy of identifying a first-type wireless AP is improved.

BRIEF DESCRIPTION OF THE DRAWINGS

FIG. 6 is a schematic flowchart 3 of a method for identifying a wireless AP according to an embodiment of the present disclosure;

DESCRIPTION OF EMBODIMENTS

Figure 1:
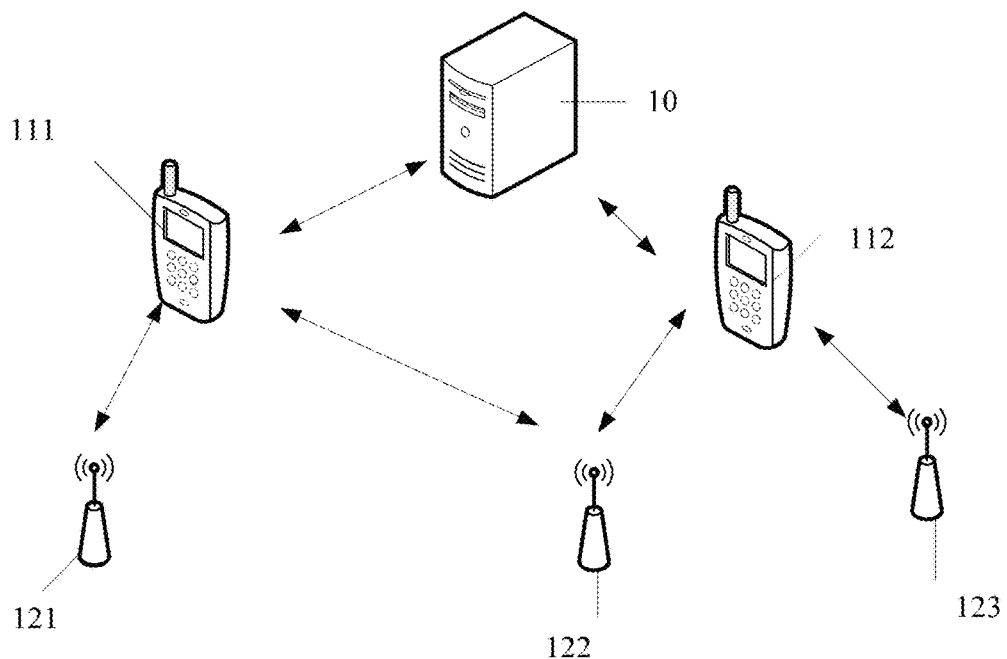
FIG. 1 is a schematic diagram of a scenario according to an embodiment of the present disclosure.

Implementation of an objective, functional characteristics, and advantages of the present disclosure are further described with reference to the accompanying drawings in combination with embodiments. It should be understood that the specific embodiments described herein are merely used to explain the present disclosure, and are not intend to limit the present disclosure. For solutions provided in the embodiments, refer to a schematic diagram of a scenario of a system. As shown in FIG. 1, the system includes a computer server 10, a terminal device 1 111, a terminal device 2 112, a wireless AP 1 121, a wireless AP 2 122, and a wireless AP 3 123. The terminal devices are communicatively connected to the computer server 10 via the wireless APs or some other means (e.g., wireless cellular networks).

Based on the foregoing system, a basic idea of the present disclosure is: A server obtains network connection information of a terminal device; determines a first number of times of connections between the terminal device and at least one wireless AP and a second number of times of connections between a wireless AP and at least one terminal device based on the network connection information; and identifies a first-type wireless AP based on the first number of times of connections and/or the second number of times of connections.

The embodiments of the present disclosure are provided based on the foregoing system structure.

Figure 2:
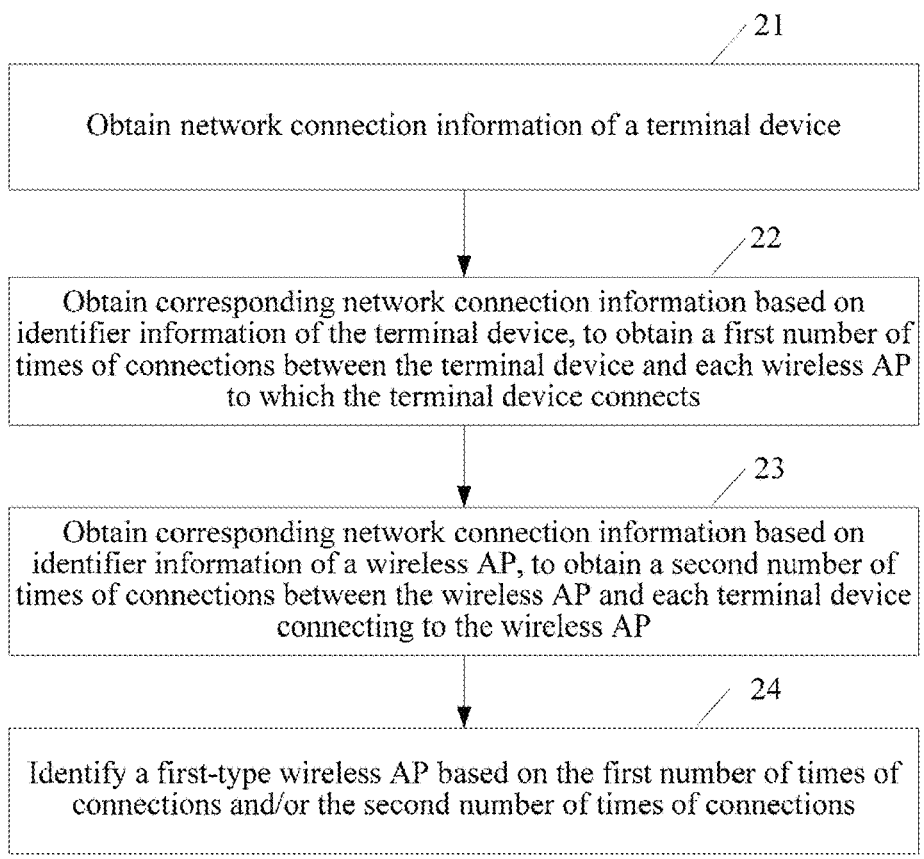
FIG. 2 is a schematic flowchart 1 of a method for identifying a wireless AP according to an embodiment of the present disclosure.

A method for identifying a wireless AP. The method may apply to a server. As shown in FIG. 2, the method includes:

Operation 21: Obtain network connection information of a terminal device, where the network connection information includes at least identifier information of the terminal device and identifier information of a respective wireless AP to which the terminal device connects.

Operation 22: Obtain corresponding network connection information based on the identifier information of the terminal device, to determine a first number of times of connections between the terminal device and the wireless AP to which the terminal device connects.

Operation 23: Obtain corresponding network connection information based on the identifier information of the wireless AP, to determine a second number of times of connections between the wireless AP and each terminal device connecting to the wireless AP.

Operation 24: Identify a first-type wireless AP based on the first number of times of connections and/or the second number of times of connections.

Herein, the terminal device and the wireless AP to which the terminal device connects in the network connection information are both identified by using the identifier information.

In addition, operation 22 and operation 23 may be performed in no particular order, or may be performed simultaneously. Alternatively, operation 22 is performed first and then operation 23 is performed. Alternatively, operation 23 is performed first and then operation 22 is performed.

Figure 3:
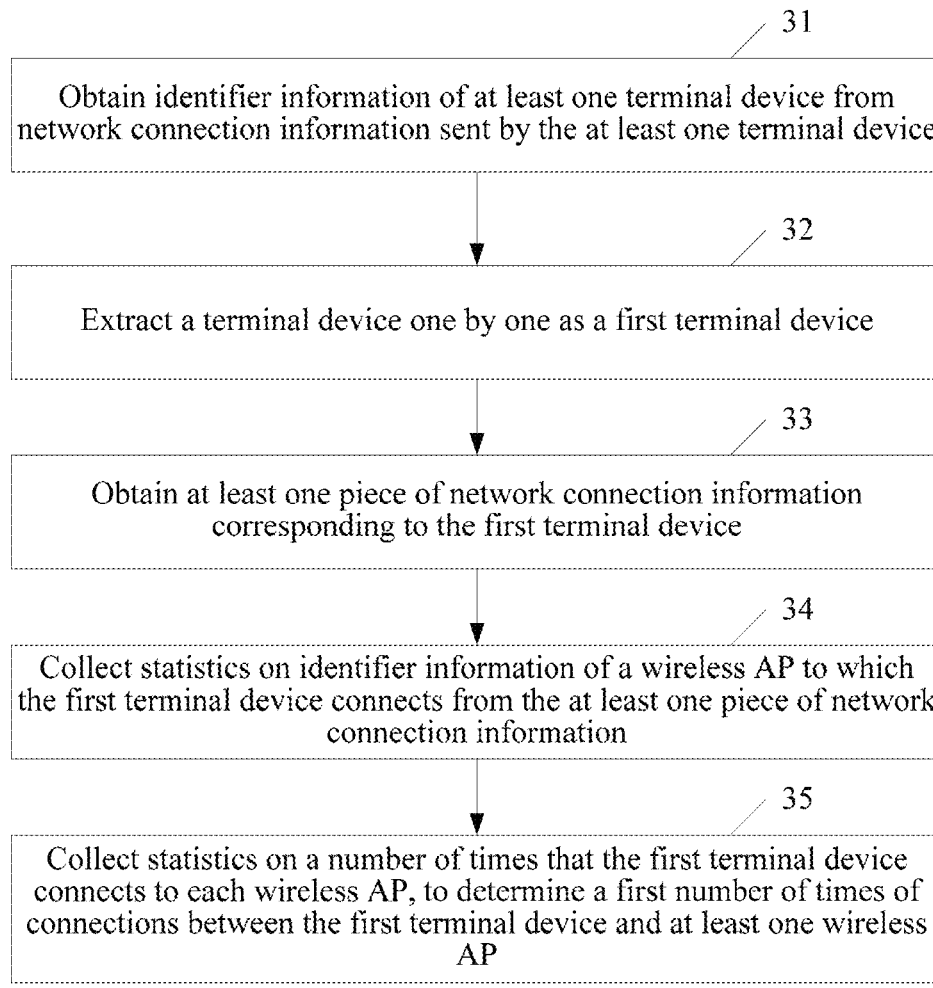
FIG. 3 is a schematic flowchart of obtaining a first number of times of connections according to an embodiment of the present disclosure.

As shown in FIG. 3, the analyzing corresponding network connection information based on the identifier information of the terminal device, to determine a first number of times of connections between the terminal device and the wireless AP to which the terminal device connects includes:

Operation 31: Obtain identifier information of at least one terminal device from network connection information sent by the at least one terminal device.

Operation 32: Extract a terminal device one by one as a first terminal device.

Operation 33: Obtain at least one piece of network connection information corresponding to the first terminal device.

Operation 34: Collect statistics on identifier information of a wireless AP to which the first terminal device connects from the at least one piece of network connection information.

Operation 35: Collect statistics on a number of times that the first terminal device connects to each wireless AP, to determine a first number of times of connections between the first terminal device and at least one wireless AP.

Figure 4:
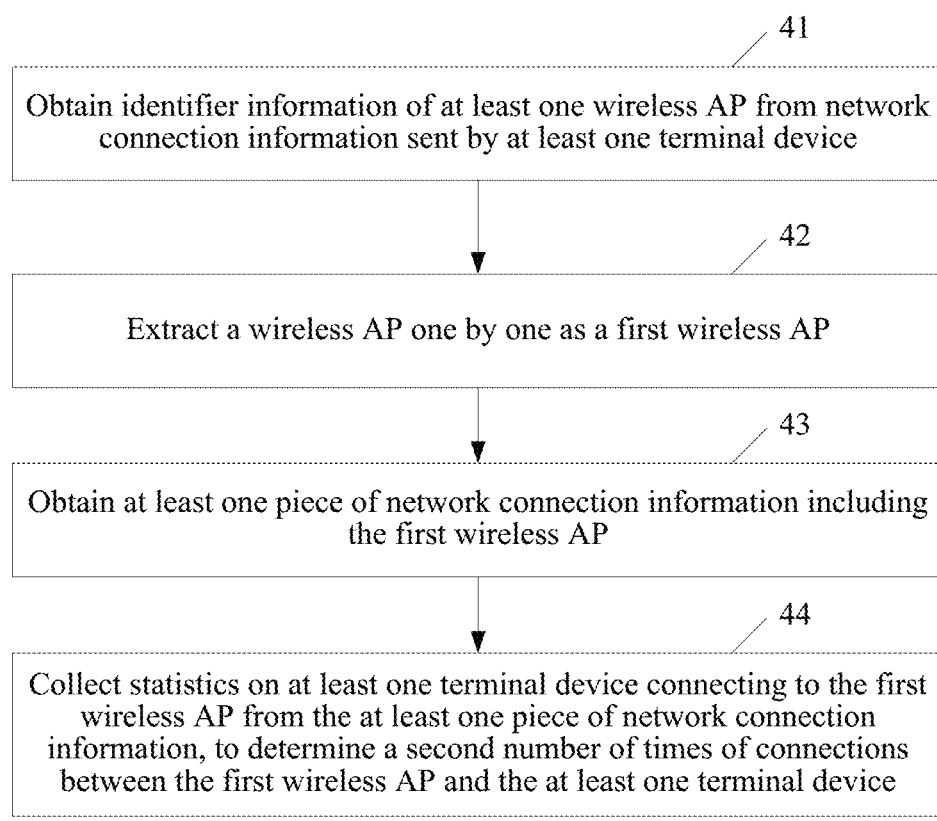
FIG. 4 is a schematic flowchart of obtaining a second number of times of connections according to an embodiment of the present disclosure.

In addition, as shown in FIG. 4, the analyzing corresponding network connection information based on the identifier information of the wireless AP, to determine a second number of times of connections between the wireless AP and each terminal device connecting to the wireless AP includes:

Operation 41: Obtain identifier information of at least one wireless AP from network connection information sent by at least one terminal device.

Operation 42: Extract a wireless AP one by one as a first wireless AP.

Operation 43: Obtain at least one piece of network connection information including the first wireless AP.

Operation 44: Collect statistics on at least one terminal device connecting to the first wireless AP from the at least one piece of network connection information, to determine a second number of times of connections between the first wireless AP and the at least one terminal device.

The identifying a first-type wireless AP may include the following two scenarios.

Scenario 1: A wireless AP to which the terminal device establishes a maximum number of connections is selected as the first-type wireless AP corresponding to the terminal device based on the first number of times of connections.

The first-type wireless AP may be a home wireless AP. That is, home wireless APs are identified from multiple wireless APs.

Scenario 2: The quantity of terminal devices connecting to a wireless AP is obtained based on the second number of times of connections; a wireless AP meeting a first preset condition is selected, where the first preset condition represents that the quantity of terminal devices connecting to the wireless AP is less than a first threshold; and a wireless AP to which a single terminal device establishes a maximum number of connections is selected from the wireless AP meeting the first preset condition as the first-type wireless AP.

The first threshold may be a value that is set according to an actual situation, and may be, for example, three. When the first-type wireless AP is a home AP, the quantity of terminal devices using the wireless AP is less than the quantity of common wireless APs. Therefore, the first-type wireless AP may be identified by using the total quantity of terminal devices connecting to a wireless AP that are in a connection relationship of wireless AP dimensions.

It can be seen that a first number of times of connections between a terminal device and a wireless AP and a second number of times of connections established between a wireless AP and a terminal device can be separately determined by means of the foregoing solution by using network connection information reported by the terminal device, and a first-type wireless AP is identified according to the first number of times of connections and the second number of times of connections. In this way, impact of a time rule can be avoided, and accuracy of identifying a first-type wireless AP is improved.

Figure 5:
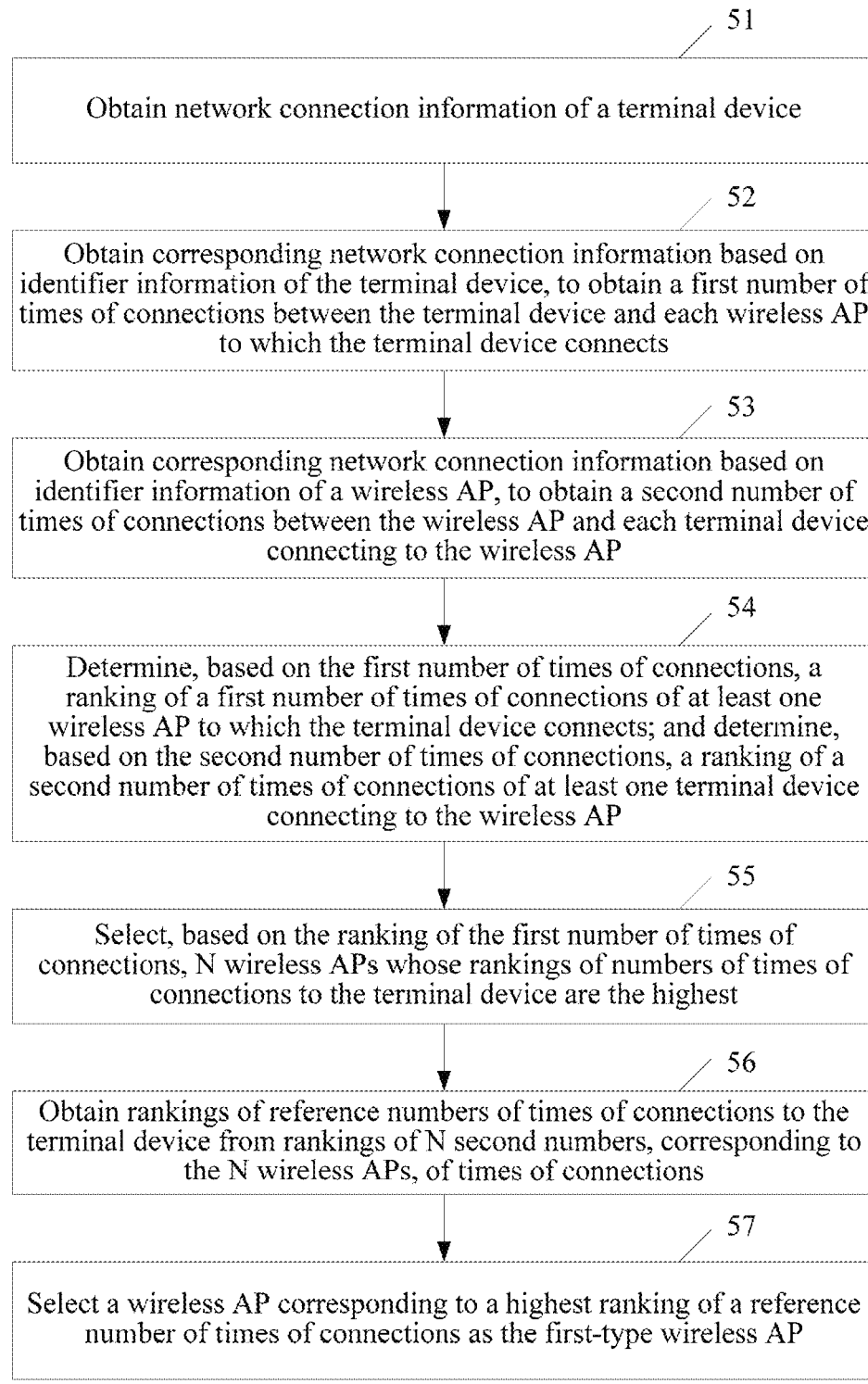
FIG. 5 is a schematic flowchart 2 of a method for identifying a wireless AP according to an embodiment of the present disclosure.

A method for identifying a wireless AP. The method may apply to a server. As shown in FIG. 5, the method includes:

Operation 51: Obtain network connection information of a terminal device, where the network connection information includes at least identifier information of the terminal device and identifier information of a respective wireless AP to which the terminal device connects.

Operation 52: Obtain corresponding network connection information based on the identifier information of the terminal device, to determine a first number of times of connections between the terminal device and the wireless AP to which the terminal device connects.

Operation 53: Obtain corresponding network connection information based on the identifier information of the wireless AP, to determine a second number of times of connections between the wireless AP and each terminal device connecting to the wireless AP.

Operation 54: Determine, based on the first number of times of connections, a ranking of a first number of times of connections of at least one wireless AP to which the terminal device connects; and determine, based on the second number of times of connections, a ranking of a second number of times of connections of at least one terminal device connecting to the wireless AP.

Operation 55: Select, based on the ranking of the first number of times of connections, N wireless APs whose rankings of numbers of times of connections to the terminal device are the highest.

Operation 56: Obtain rankings of reference numbers of times of connections to the terminal device from rankings of N second numbers, corresponding to the N wireless APs, of times of connections.

Operation 57: Select a wireless AP corresponding to a highest ranking of a reference number of times of connections as the first-type wireless AP.

Herein, the terminal device and the wireless AP to which the terminal device connects in the network connection information are both identified by using the identifier information. In addition, operation 52 and operation 53 may be performed in no particular order, or may be performed simultaneously. Alternatively, operation 52 is performed first and then operation 53 is performed. Alternatively, operation 53 is performed first and then operation 52 is performed.

Specifically, the identifier information of the terminal device may be an international mobile equipment identity (IMEI). The identifier information of the wireless AP may include a service set identifier (SSID) and a BSSID. The BSSID is a special Ad-hoc LAN application, is also referred to as a basic service set (BSS), and is actually a MAC address of an AP. A same BSS name is set for a cluster of computers, and one group can be formed. Each BSS is assigned one BSSID. The BSSID is a binary identifier having the length of 48 bits, and is used to identify a different BSS. In addition, each terminal device may initiate at least one piece of network connection information. Each piece of network connection information may be network connection information that is generated and sent by a terminal device when the terminal device connects to different wireless APs at different times.

In addition, as shown in FIG. 3, the analyzing corresponding network connection information based on the identifier information of the terminal device, to determine a first number of times of connections between the terminal device and the wireless AP to which the terminal device connects includes:

Operation 31: Obtain identifier information of at least one terminal device from network connection information sent by the at least one terminal device.

Operation 32: Extract a terminal device one by one as a first terminal device.

Operation 33: Obtain at least one piece of network connection information corresponding to the first terminal device.

Operation 34: Collect statistics on identifier information of a wireless AP to which the first terminal device connects from the at least one piece of network connection information.

Operation 35: Collect statistics on a number of times that the first terminal device connects to each wireless AP, to determine a first number of times of connections between the first terminal device and at least one wireless AP.

In addition, as shown in FIG. 4, the analyzing corresponding network connection information based on the identifier information of the wireless AP, to determine a second number of times of connections between the wireless AP and each terminal device connecting to the wireless AP includes:

Operation 41: Obtain identifier information of at least one wireless AP from network connection information sent by at least one terminal device.

Operation 42: Extract a wireless AP one by one as a first wireless AP.

Operation 43: Obtain at least one piece of network connection information including the first wireless AP.

Operation 44: Collect statistics on at least one terminal device connecting to the first wireless AP from the at least one piece of network connection information, to determine a second number of times of connections between the first wireless AP and the at least one terminal device.

The determining, based on the first number of times of connections, a ranking of a first number of times of connections of at least one wireless AP to which the terminal device connects may be selecting a corresponding first number of times of connections based on the identifier information of the terminal device, and obtaining a number of times of connections, between the terminal device and at least one wireless AP, of the first number of times of connections; and performing ranking based on the number of times of connections, to obtain the ranking of the first number of times of connections of the at least one wireless AP.

Correspondingly, the determining, based on the second number of times of connections, a ranking of a second number of times of connections of the at least one terminal device connecting to the wireless AP may be selecting a corresponding second number of times of connections based on the identifier information of the wireless AP, and obtaining a number of times of connections, between the wireless AP and at least one terminal device, of the second number of times of connections; and performing ranking based on the number of times of connections, to obtain the ranking of the second number of times of connections of the at least one terminal device.

An IMEI is used to represent a terminal device, and an SSID and a BSSID are used to represent a wireless AP. On a side of a server, the foregoing two numbers of connection times may be reflected in a table form, and is further corresponding to, based on terminal device dimensions, a ranking of the number of connection times of a wireless AP to which a terminal device connects, and is corresponding to a ranking of the number of connection times of a connected terminal device based on wireless AP dimensions, respectively. As shown in Table 1, a table of a relationship between an IMEI and SSID+BSSID may be established in the following:

TABLE 1

| IMEI | SSID + BSSID | Connection times | Ranking of the number of connection times of a wireless AP corresponding to a terminal device | Ranking of the corresponding number of connection times of a wireless AP |
|---|---|---|---|---|
| 1234 | xxxx | 20 | 1 | 4 |
| 1234 | yyyy | 15 | 2 | 2 |

As shown in Table 1, a wireless AP whose intimacy is the highest, that is, whose ranking of the number of connection times is the highest of the wireless AP to which each terminal device connects may be found from the terminal device dimensions. However, there is a disadvantage. For example, the popularity of some wireless APs working a relatively long time may be higher than that of a home wireless AP. The problem is corrected by using the solution provided in this disclosure and the ranking of the number of connection times of the terminal device from the wireless AP dimensions. Finally, identifying the first-type wireless AP is determined according to obtained comprehensive rankings.

Further, subsequent operations for the first-type wireless AP may be further provided in this disclosure. For example, the first-type wireless AP may be bound to a terminal device corresponding to the first-type wireless AP, to provide security protection. When it is detected on a side of a server that a terminal device needs to connect to the first-type wireless AP, it is checked whether the terminal device is a recorded terminal device. If the terminal device is not a recorded terminal device, prompt information may be initiated to the terminal device bound to the first-type wireless AP, to prompt a user that another device needs to connect to the AP. If the user agrees that the another device connects to the AP, another terminal device may connect to the first-type wireless AP.

It can be seen that a first number of times of connections between a terminal device and a wireless AP and a second number of times of connections established between a wireless AP and a terminal device can be separately determined by means of the foregoing solution by using network connection information reported by the terminal device, and a first-type wireless AP is identified according to the first number of times of connections and the second number of times of connections. In this way, impact of a time rule can be avoided, and accuracy of identifying a first-type wireless AP is improved.

A method for identifying a wireless AP. The method may apply to a server. As shown in FIG. 6, the method includes:

Operation 61: Obtain network connection information of a terminal device, where the network connection information includes at least identifier information of the terminal device and identifier information of a respective wireless AP to which the terminal device connects; the network connection information further includes: a time period in which the terminal device establishes a connection to the wireless AP.

Operation 62: Obtain corresponding network connection information based on the identifier information of the terminal device, to determine a first number of times of connections between the terminal device and the wireless AP to which the terminal device connects.

Operation 63: Obtain corresponding network connection information based on the identifier information of the wireless AP, to determine a second number of times of connections between the wireless AP and each terminal device connecting to the wireless AP.

Operation 64: Determine, based on the first number of times of connections, a ranking of a first number of times of connections of at least one wireless AP to which the terminal device connects; and determine, based on the second number of times of connections, a ranking of a second number of times of connections of at least one terminal device connecting to the wireless AP.

Operation 65: Select, based on the ranking of the first number of times of connections, N wireless APs whose rankings of numbers of times of connections to the terminal device are the highest.

Operation 66: Obtain rankings of reference numbers of times of connections to the terminal device from rankings of N second numbers, corresponding to the N wireless APs, of times of connections.

Operation 67: Select M wireless APs whose rankings of reference numbers of times of connections are the highest, where M is a positive integer greater than or equal to 1 and less than or equal to N.

Operation 68: Set, as the first-type wireless AP based on the time period that is in the network connection information and in which the terminal device establishes a connection to the AP, a wireless AP of the M wireless APs that meets a second preset condition, where the second preset condition represents selecting a wireless AP to which a terminal device establishes a connection within a preset time period.

Herein, the terminal device and the wireless AP to which the terminal device connects in the network connection information are both identified by using the identifier information. Specifically, the identifier information of the terminal device may be an IMEI of the terminal device. The identifier information of the wireless AP may include an SSID and a BSSID. In addition, each terminal device may initiate at least one piece of network connection information. Each piece of network connection information may be network connection information that is generated and sent by a terminal device when the terminal device connects to different wireless APs at different times.

A manner for obtaining network connection information may be regularly sending the network connection information by the terminal device or may be periodically obtaining the network connection information by the server. The obtaining network connection information may be obtaining the network connection information from a WiFi connection log stored on a side of the terminal device.

In some embodiments, for each terminal device, the server determines a rank for each respective wireless AP to which the terminal device connects by performing the following operations:

analyzing corresponding network connection information based on the identifier information of the terminal device, to determine a first number of times of connections between the terminal device and the wireless AP to which the terminal device connects;

analyzing corresponding network connection information based on the identifier information of the wireless AP, to determine a second number of times of connections between the wireless AP and each terminal device connecting to the wireless AP; and determining the rank for the wireless AP based on a weighted average of the first number of times of connections between the terminal device and the wireless AP to which the terminal device connects and the second number of times of connections between the wireless AP and each terminal device connecting to the wireless AP; and returning identifier information of one or more wireless APs as a first-type wireless AP to which the terminal device connects and their corresponding ranks to the terminal device.

For example, whenever the terminal device is connected to a wireless AP, the terminal device sends a message to the server reporting the connection. Such message may be sent out on an individual connection basis or periodically including all the connections happening during a predefined time period. For each connection, the message includes at least identifier information of the terminal device and identifier information of a respective wireless AP to which the terminal device connects.

Based on such connection information that has been accumulated over time, the computer server can establish a many-to-many mapping relationship between the plurality of terminal devices and the plurality of wireless APs. For each terminal devices, one or more wireless APs are chosen as the first-type wireless APs based on their connection activities with the terminal device and other terminal devices. For example, a wireless AP to which the terminal device connects most frequently in terms of the quantity of connections or the amount of connection time is given a higher weight than other wireless APs and it is therefore more likely to be chosen as one of the first-type wireless AP. This wireless AP is often the Wi-Fi connection at the home of the owner of the terminal device. In sum, a wireless AP to which the terminal device connects most frequently in terms of the quantity of connections or the amount of connection time is given a higher weight and it is therefore more likely to be chosen as one of the first-type wireless AP.

Similarly, a wireless AP that has a regular, stable connection relation with a number of terminal devices (including the terminal device) is also given a higher weight because it may be the Wi-Fi connection at the office where the owner of the terminal device works. By contrast, a wireless AP (e.g., one at a hotel or an airport lounge) should be given a relatively lower weight because such wireless AP does not have a regular connection pattern with a certain number of terminal devices. The connection patterns associated with this type of wireless AP is often unpredictable. For example, a hotel's wireless AP may have a lot of connections when there are a lot of guests at the hotel attending a conference during a few days and then very few connections after the conference is over.

In some embodiments, the server regularly communicates with a plurality of terminal devices to receive their wireless connection information during a predefined time period and then analyzes such connection information to establish a wireless connection profile for each terminal device. The wireless connection profile includes identifier information of one or more first-type wireless APs identified by the server as being reliable and trustworthy. According to a predefined schedule (e.g., per week or per month), the computer server receives a wireless AP update request from a terminal device. In response to the request, the computer server identifies one or more wireless APs to which the terminal device connected before and then arranges them in an order in accordance with their respective ranks determined by the computer server based on the network connection information associated with these wireless APs. The order information is used for updating the wireless connection profile of the terminal device. Finally, the computer server returns the updated wireless connection profile including the identifier information of the one or more wireless APs identified as the first-type wireless AP and their associated order to the terminal device. After receiving the updated wireless connection profile, the terminal device follows the order of the one or more wireless APs defined by the updated wireless connection profile when trying to establish a wireless network connection with one of the wireless APs.

In addition, as shown in FIG. 3, the analyzing corresponding network connection information based on the identifier information of the terminal device, to determine a first number of times of connections between the terminal device and the wireless AP to which the terminal device connects includes:

Operation 31: Obtain identifier information of at least one terminal device from network connection information sent by the at least one terminal device.

Operation 32: Extract a terminal device one by one as a first terminal device.

Operation 33: Obtain at least one piece of network connection information corresponding to the first terminal device.

Operation 34: Collect statistics on identifier information of a wireless AP to which the first terminal device connects from the at least one piece of network connection information.

Operation 35: Collect statistics on a number of times that the first terminal device connects to each wireless AP, to determine a first number of times of connections between the first terminal device and at least one wireless AP.

In addition, as shown in FIG. 4, the analyzing corresponding network connection information based on the identifier information of the wireless AP, to determine a second number of times of connections between the wireless AP and each terminal device connecting to the wireless AP includes:

Operation 41: Obtain identifier information of at least one wireless AP from network connection information sent by at least one terminal device.

Operation 42: Extract a wireless AP one by one as a first wireless AP.

Operation 43: Obtain at least one piece of network connection information including the first wireless AP.

Operation 44: Collect statistics on at least one terminal device connecting to the first wireless AP from the at least one piece of network connection information, to determine a second number of times of connections between the first wireless AP and the at least one terminal device.

The determining, based on the first number of times of connections, a ranking of a first number of times of connections of at least one wireless AP to which the terminal device connects may be selecting a corresponding first number of times of connections based on the identifier information of the terminal device, and obtaining a number of times of connections, between the terminal device and at least one wireless AP, of the first number of times of connections; and performing ranking based on the number of times of connections, to obtain the ranking of the first number of times of connections of the at least one wireless AP.

Correspondingly, the determining, based on the second number of times of connections, a ranking of a second number of times of connections of the at least one terminal device connecting to the wireless AP may be selecting a corresponding second number of times of connections based on the identifier information of the wireless AP, and obtaining a number of times of connections, between the wireless AP and at least one terminal device, of the second number of times of connections; and performing ranking based on the number of times of connections, to obtain the ranking of the second number of times of connections of the at least one terminal device.

A difference between this embodiment and Embodiment 2 is that an operation of performing filtering according to a time period is added based on Embodiment 2. The preset time period may be a time period that is set according to an actual situation. For example, the time period may be set to 8:00 p.m. to 8:00 a.m.

For the solution provided, refer to a schematic diagram of a scenario. As shown in FIG. 1, it is assumed that identifier information of a terminal device 1 111 is "001", and identifier information of a terminal device 2 112 is "002"; identifier information of a wireless AP 1 121 is "xxxx", identifier information of a wireless AP 2 122 is "yyyy", and identifier information of a wireless AP 3 123 is "zzzz".

In this embodiment, an IMEI is used to represent a terminal device, and an SSID and a BSSID are used to represent a wireless AP. On a side of a server, the foregoing two connection relationships may be reflected in a table form, and is further corresponding to, based on terminal device dimensions, a ranking of the number of connection times of a wireless AP to which a terminal device connects, and is corresponding to a ranking of the number of connection times of a connected terminal device based on wireless AP dimensions, respectively. As shown in Table 2, a table of a relationship between an IMEI and SSID+BSSID may be established in the following:

TABLE 2

| IMEI | SSID + BSSID | Connection times | Ranking of the number of connection times of a wireless AP corresponding to a terminal device | Ranking of the corresponding number of connection times of a wireless AP |
|---|---|---|---|---|
| 001 | xxxx | 20 | 1 | 1 |
| 001 | yyyy | 15 | 2 | 8 |
| 002 | yyyy | 18 | 2 | 1 |
| 002 | zzzz | 25 | 1 | 1 |

It can be seen from Table 2 that the terminal device 1 separately connects to the wireless AP 1 and the wireless AP 2. A number of times of connections to the wireless AP 1 ranks first, and a number of times of connections established between the wireless AP 1 and the terminal device 1 also ranks first. In this way, the wireless AP 1 may be determined as a first-type wireless AP, that is, a home AP, corresponding to the terminal device 1. Similarly, for the terminal device 2, the wireless AP 3 may be determined as the first-type wireless AP by using the same method.

Figure 7:
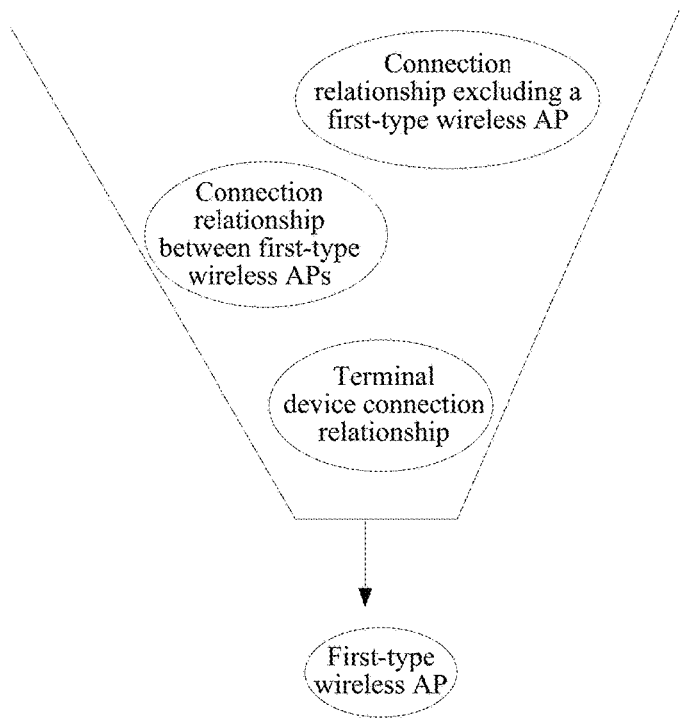
FIG. 7 is a schematic diagram of a processing procedure according to an embodiment of the present disclosure.
Figure 8:
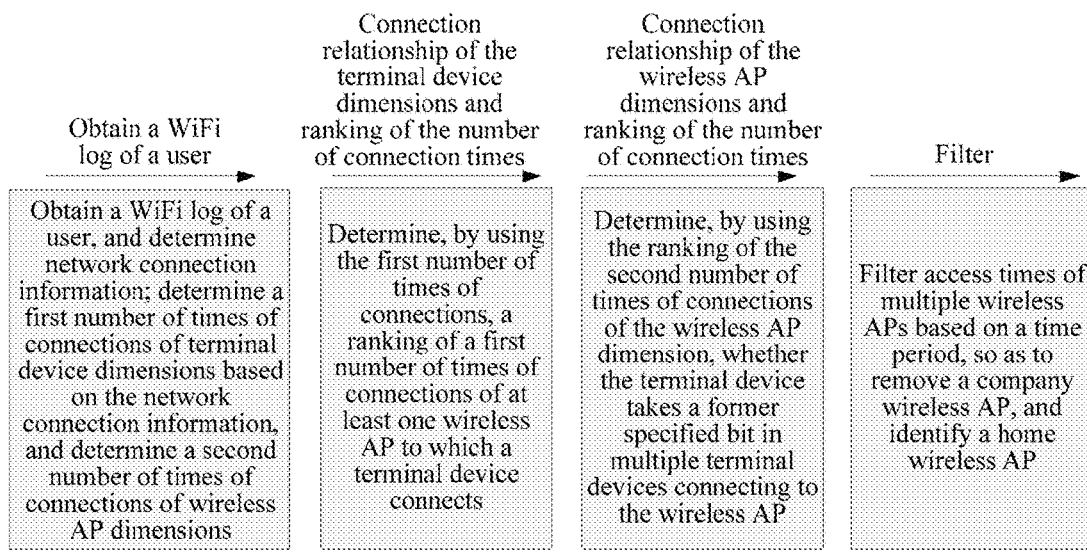
FIG. 8 is a schematic diagram of an implementation procedure according to an embodiment of the present disclosure.

Identification logic may be shown in FIG. 7 and FIG. 8, that is, determining a first-type wireless AP based on a connection relationship between a wireless AP and a terminal device. It is assumed that the first-type wireless AP is a home AP, and another wireless APs are a company AP, as shown in FIG. 8, the network connection information is determined by using a WiFi log of a user of the terminal device; a first number of times of connections of terminal device dimensions is determined based on the network connection information, and a second number of times of connections of wireless AP dimensions is determined;

a ranking of a first number of times of connections of at least one wireless AP to which the terminal device connects is determined by using the first number of times of connections, and a wireless AP of a former specified bit of the ranking is determined according to the ranking of the first number of times of connections;

determining, by using a ranking of a second number of times of connections of the wireless AP dimensions, whether the terminal device takes a former specified bit in multiple terminal devices connecting to the wireless AP, where the former specified bit may be the quantity that is set according to an actual case, and may be, for example, the former three bits; and filtering access times of multiple wireless APs based on a time period, so as to remove a company wireless AP, and identify a home wireless AP.

Figure 9:
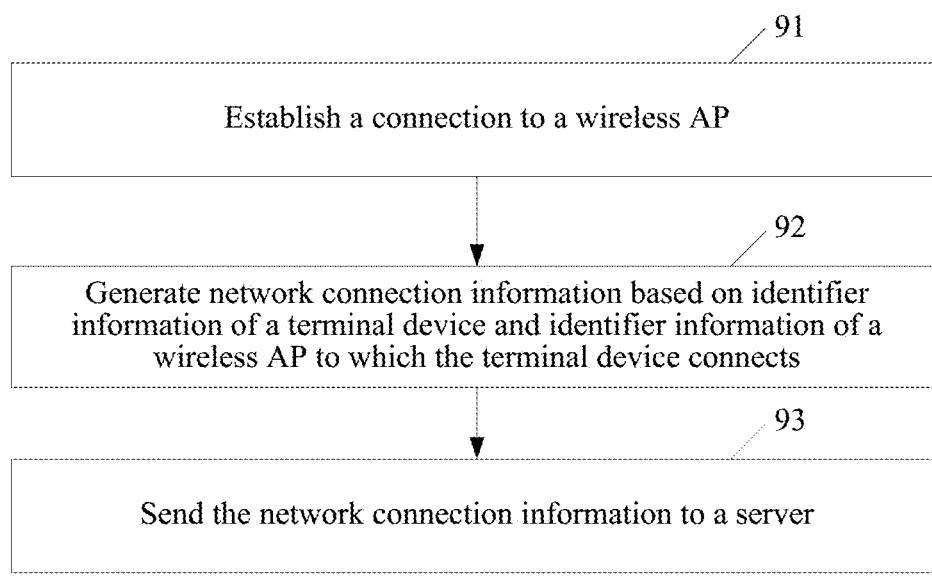
FIG. 9 is a schematic flowchart 4 of a method for identifying a wireless AP according to an embodiment of the present disclosure.

This embodiment of the present disclosure may further provide a method, on a side of a terminal device, for processing a method for identifying a wireless AP. As shown in FIG. 9, the method includes:

Operation 91: Establish a connection to a wireless AP.

Operation 92: Generate network connection information based on identifier information of the terminal device and identifier information of a respective wireless AP to which the terminal device connects.

Operation 93: Send the network connection information to a server, so that the server identifies a first-type wireless AP based on the network connection information.

Herein, the terminal device and the wireless AP to which the terminal device connects in the network connection information are both identified by using the identifier information. Specifically, the identifier information of the terminal device may be an IMEI of the terminal device. The identifier information of the wireless AP may include an SSID and a BSSID. In addition, each terminal device may initiate at least one piece of network connection information. Each piece of network connection information may be network connection information that is generated and sent by a terminal device when the terminal device connects to different wireless APs at different times.

A manner for obtaining network connection information may be regularly sending the network connection information by the terminal device or may be periodically obtaining the network connection information by the server. The obtaining the network connection information may be obtaining the network connection information from a WiFi connection log stored on a side of the terminal device.

Figure 10:
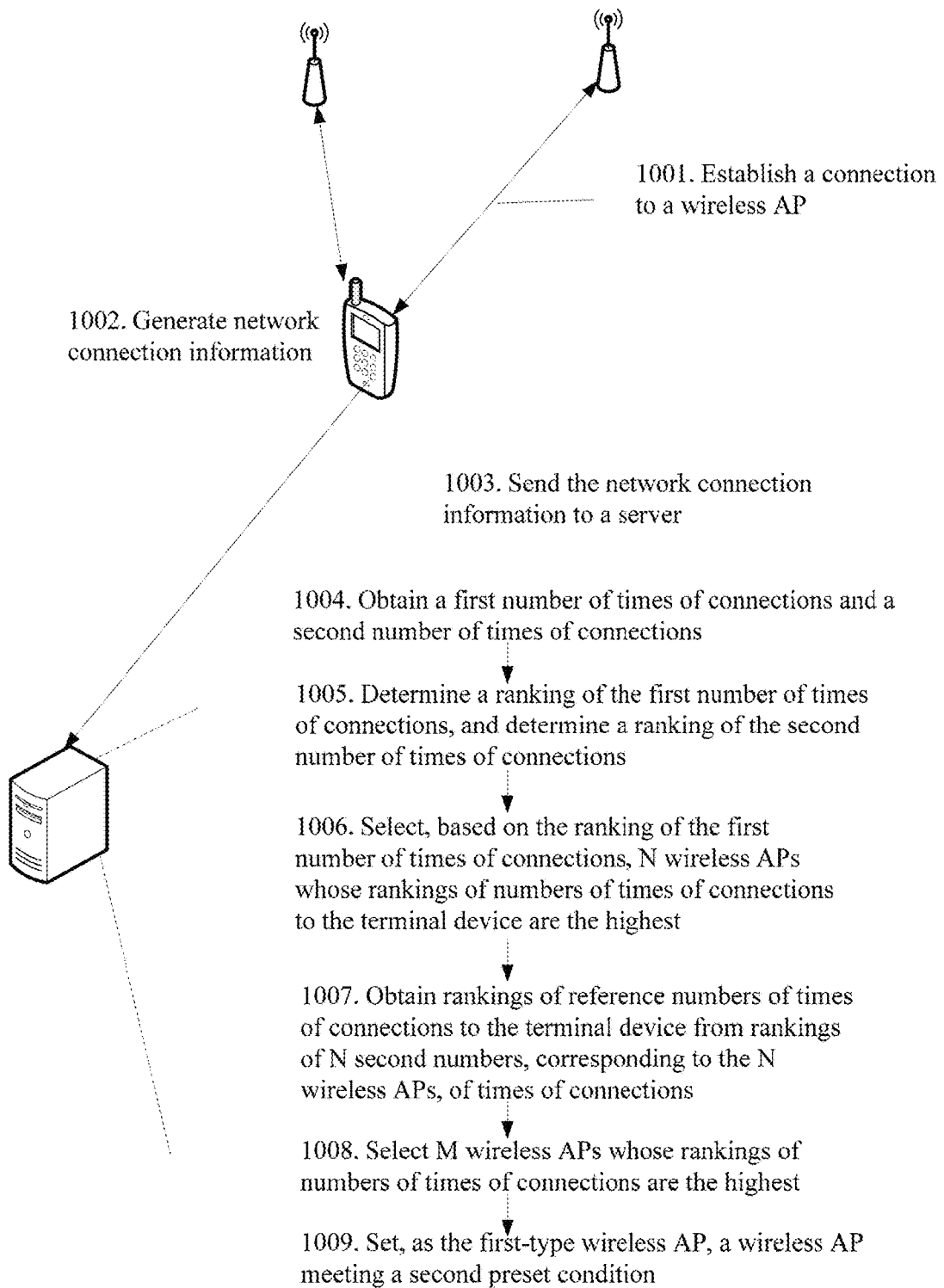
FIG. 10 is a schematic flowchart 5 of a method for identifying a wireless AP according to an embodiment of the present disclosure.

Preferably, FIG. 10 is used as an example, to describe an operation of obtaining network connection information from a terminal device and uploading the network connection information, until a first-type wireless AP is identified on the side of the server based on the network connection information:

Operation 1001: Establish a connection to a wireless AP, where time periods of establishing a connection to two different wireless APs are different.

Operation 1002: Generate network connection information based on identifier information of the terminal device and identifier information of the wireless AP to which the terminal device connects.

Operation 1003: Send the network connection information to a server.

Operation 1004: The server obtains the network connection information of the terminal device, where the network connection information includes at least the identifier information of the terminal device and the identifier information of a respective wireless AP to which the terminal device connects and the network connection information further includes: a time period in which the terminal device establishes a connection to a wireless AP; obtains corresponding network connection information based on the identifier information of the terminal device, to determine a first number of times of connections between the terminal device and the wireless AP to which the terminal device connects; and obtains corresponding network connection information based on the identifier information of the wireless AP, to determine a second number of times of connections between the wireless AP and each terminal device connecting to the wireless AP.

Operation 1005: Determine, based on the first number of times of connections, a ranking of a first number of times of connections of at least one wireless AP to which the terminal device connects; and determine, based on the second number of times of connections, a ranking of a second number of times of connections of at least one terminal device connecting to the wireless AP.

Operation 1006: Select, based on the ranking of the first number of times of connections, N wireless APs whose rankings of numbers of times of connections to the terminal device are the highest.

Operation 1007: Obtain rankings of reference numbers of times of connections to the terminal device from rankings of N second numbers, corresponding to the N wireless APs, of times of connections.

Operation 1008: Select M wireless APs whose rankings of reference numbers of times of connections are the highest, where M is a positive integer greater than or equal to 1 and less than or equal to N.

Operation 1009: Set, as the first-type wireless AP based on the time period that is in the network connection information and in which the terminal device establishes a connection to the AP, a wireless AP of the M wireless APs that meets a second preset condition, where the second preset condition represents selecting a wireless AP to which a terminal device establishes a connection within a preset time period.

The preset time period may be a time period according to an actual situation. For example, the time period may be set to 8:00 p.m. to 8:00 a.m.

It can be seen that a first number of times of connections between a terminal device and a wireless AP and a second number of times of connections established between a wireless AP and a terminal device can be separately determined by means of the foregoing solution by using network connection information reported by the terminal device, and a first-type wireless AP is identified according to the first number of times of connections and the second number of times of connections. In this way, impact of a time rule can be avoided, and accuracy of identifying a first-type wireless AP is improved.

This embodiment of the present disclosure provides a computer server. In some embodiments, the computer server typically includes one or more processing units (CPU's) for executing modules, memory storing programs and/or instructions for performing processing operations; one or more network or other communications interfaces; and one or more communication buses for interconnecting these components. The communication buses optionally include circuitry (sometimes called a chipset) that interconnects and controls communications between system components. Memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory may optionally include one or more storage devices remotely located from the CPU(s). Memory, or alternately the non-volatile memory device(s) within memory, comprises a non-transitory computer readable storage medium. In some embodiments, memory, or the computer readable storage medium of memory stores the following programs, modules and data structures, or a subset thereof:

an operating system that includes procedures for handling various basic system services and for performing hardware dependent tasks; and a network communication module that is used for connecting the computer server to other computers (e.g., the terminal devices) via the one or more communication network interfaces (wired or wireless) and one or more communication networks, such as the Internet, other wide area networks, local area networks, metropolitan area networks, and so on.

Figure 11:
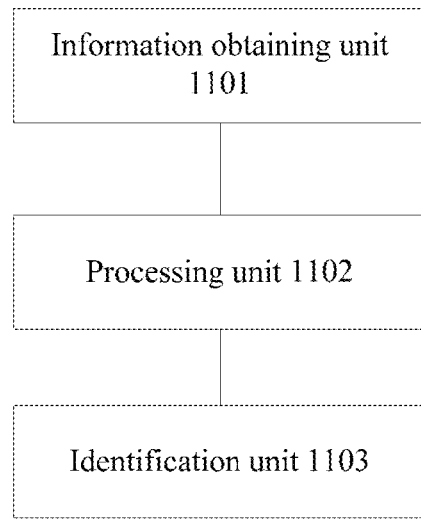
FIG. 11 is a schematic structural composition diagram 1 a server according to an embodiment of the present disclosure.

As shown in FIG. 11, the server further includes:

an information obtaining unit 1101, configured to obtain network connection information of a terminal device, the network connection information including at least identifier information of the terminal device and identifier information of a respective wireless AP to which the terminal device connects;

a processing unit 1102, configured to: obtain corresponding network connection information based on the identifier information of the terminal device, to determine a first number of times of connections between the terminal device and the wireless AP to which the terminal device connects; and obtain corresponding network connection information based on the identifier information of the wireless AP, to determine a second number of times of connections between the wireless AP and each terminal device connecting to the wireless AP; and an identification unit 1103, configured to identify a first-type wireless AP based on the first number of times of connections and/or the second number of times of connections.

Herein, the terminal device and the wireless AP to which the terminal device connects in the network connection information are both identified by using the identifier information.

In this embodiment, the corresponding network connection information is obtained based on the identifier information of the terminal device, to obtain the first number of times of connections between the terminal device and each wireless AP to which the terminal device connects. The processing unit 1102 is specifically configured to: obtain identifier information of at least one terminal device from network connection information sent by the at least one terminal device; extract a terminal device one by one as a first terminal device; obtain at least one piece of network connection information corresponding to the first terminal device; collect statistics on identifier information of a wireless AP to which the first terminal device connects from the at least one piece of network connection information; and collect statistics on a number of times that the first terminal device connects to each wireless AP, to determine a first number of times of connections between the first terminal device and at least one wireless AP.

In addition, the processing unit 1102 is specifically configured to: obtain identifier information of at least one wireless AP from the network connection information sent by the at least one terminal device; extract a wireless AP one by one as a first wireless AP; obtain at least one piece of network connection information including the first wireless AP; collect statistics on at least one terminal device connecting to the first wireless AP from the at least one piece of network connection information, to determine a second number of times of connections between the first wireless AP and the at least one terminal device.

Figure 12:
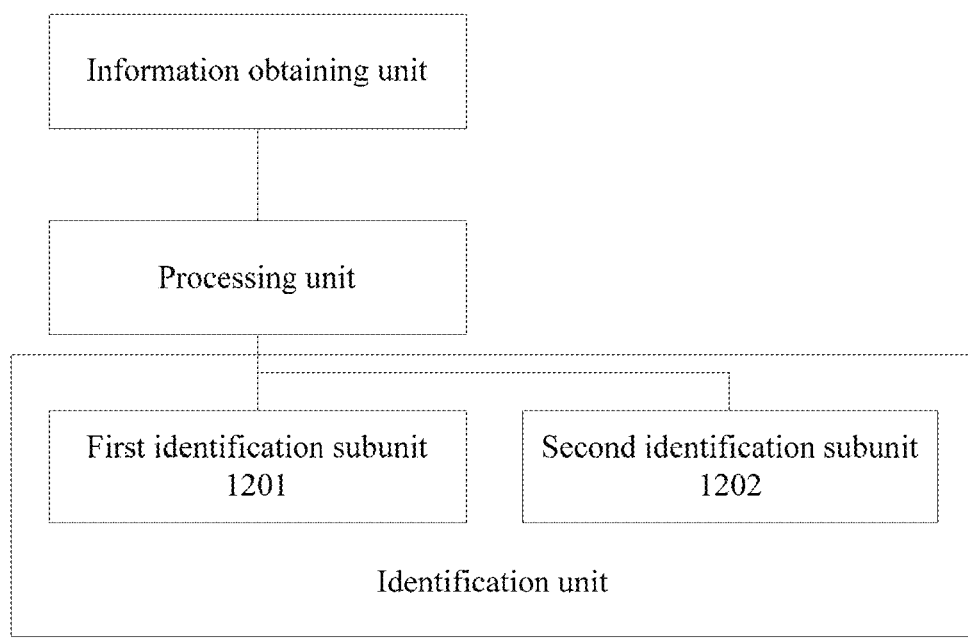
FIG. 12 is a schematic structural composition diagram 2 of a server according to an embodiment of the present disclosure.

Preferably, as shown in FIG. 12, the identification unit includes: a first identification subunit 1201, configured to select, as the first-type wireless AP corresponding to the terminal device based on the first number of times of connections, a wireless AP to which the terminal device establishes a maximum number of connections.

Alternatively, the identification unit includes: a second identification subunit 1202, configured to: obtain, based on the second number of times of connections, the quantity of terminal devices connecting to the wireless AP; select a wireless AP meeting a first preset condition, where the first preset condition represents that the quantity of terminal devices connecting to the wireless AP is less than a first threshold; and select, from the wireless AP meeting the first preset condition as the first-type wireless AP, a wireless AP to which a single terminal device establishes a maximum number of connections.

The first threshold may be a value that is set according to an actual situation, and may be, for example, three. When the first-type wireless AP is a home AP, the quantity of terminal devices using the wireless AP is less than the quantity of common wireless APs. Therefore, the first-type wireless AP may be identified by using the total quantity of terminal devices connecting to a wireless AP that are in a connection relationship of wireless AP dimensions.

It can be seen that a first number of times of connections between a terminal device and a wireless AP and a second number of times of connections established between a wireless AP and a terminal device can be separately determined by means of the foregoing solution by using network connection information reported by the terminal device, and a first-type wireless AP is identified according to the first number of times of connections and the second number of times of connections. In this way, impact of a time rule can be avoided, and accuracy of identifying a first-type wireless AP is improved.

Figure 13:
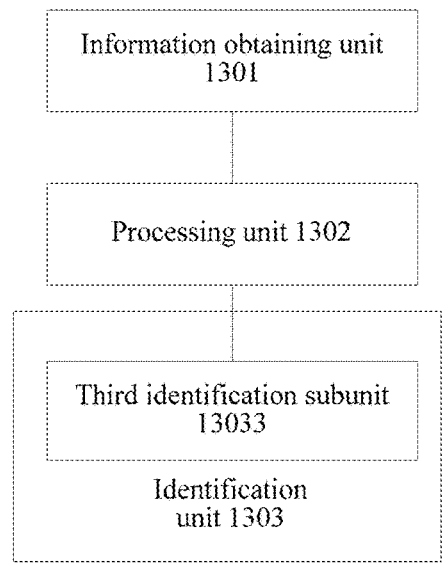
FIG. 13 is a schematic structural composition diagram 3 of a server according to an embodiment of the present disclosure.

This embodiment of the present disclosure provides a server. As shown in FIG. 13, the server includes:

an information obtaining unit 1301, configured to obtain network connection information of a terminal device, the network connection information including at least identifier information of the terminal device and identifier information of a respective wireless AP to which the terminal device connects;

a processing unit 1302, configured to: obtain corresponding network connection information based on the identifier information of the terminal device, to determine a first number of times of connections between the terminal device and the wireless AP to which the terminal device connects; and obtain corresponding network connection information based on the identifier information of the wireless AP, to determine a second number of times of connections between the wireless AP and each terminal device connecting to the wireless AP; and an identification unit 1303, configured to identify a first-type wireless AP based on the first number of times of connections and/or the second number of times of connections.

Herein, the terminal device and the wireless AP to which the terminal device connects in the network connection information are both identified by using the identifier information. Specifically, the identifier information of the terminal device may be an IMEI of the terminal device. The identifier information of the wireless AP may include an SSID and a BSSID. In addition, each terminal device may initiate at least one piece of network connection information. Each piece of network connection information may be network connection information that is generated and sent by a terminal device when the terminal device connects to different wireless APs at different times.

In this embodiment, the corresponding network connection information is obtained based on the identifier information of the terminal device, to obtain the first number of times of connections between the terminal device and each wireless AP to which the terminal device connects. The processing unit 1302 is specifically configured to: obtain identifier information of at least one terminal device from network connection information sent by the at least one terminal device; extract a terminal device one by one as a first terminal device; obtain at least one piece of network connection information corresponding to the first terminal device; collect statistics on identifier information of a wireless AP to which the first terminal device connects from the at least one piece of network connection information; and collect statistics on a number of times that the first terminal device connects to each wireless AP, to determine a first number of times of connections between the first terminal device and at least one wireless AP.

In addition, the processing unit 1302 is specifically configured to: obtain identifier information of at least one wireless AP from the network connection information sent by the at least one terminal device; extract a wireless AP one by one as a first wireless AP; obtain at least one piece of network connection information including the first wireless AP; collect statistics on at least one terminal device connecting to the first wireless AP from the at least one piece of network connection information, to determine a second number of times of connections between the first wireless AP and the at least one terminal device.

The identification unit includes: a third identification subunit 13033, configured to: determine, based on the first number of times of connections, a ranking of a first number of times of connections of at least one wireless AP to which the terminal device connects; determine, based on the second number of times of connections, a ranking of a second number of times of connections of at least one terminal device connecting to the wireless AP; select, based on the ranking of the first number of times of connections, N wireless APs whose rankings of numbers of times of connections to the terminal device are the highest; obtain rankings of reference numbers of times of connections to the terminal device from rankings of N second numbers, corresponding to the N wireless APs, of times of connections; and select a wireless AP corresponding to a highest ranking of a reference number of times of connections as the first-type wireless AP.

Subsequent operations for the first-type wireless AP may be further provided. For example, the first-type wireless AP may be bound to a terminal device corresponding to the first-type wireless AP, to provide security protection. When it is detected on a side of a server that a terminal device needs to connect to the first-type wireless AP, it is checked whether the terminal device is a recorded terminal device. If the terminal device is not a recorded terminal device, prompt information may be initiated to the terminal device bound to the first-type wireless AP, to prompt a user that another device needs to connect to the AP. If the user agrees that the another device connects to the AP, another terminal device may connect to the first-type wireless AP.

It can be seen that a first number of times of connections between a terminal device and a wireless AP and a second number of times of connections established between a wireless AP and a terminal device can be separately determined by means of the foregoing solution by using network connection information reported by the terminal device, and a first-type wireless AP is identified according to the first number of times of connections and the second number of times of connections. In this way, impact of a time rule can be avoided, and accuracy of identifying a first-type wireless AP is improved.

Figure 14:
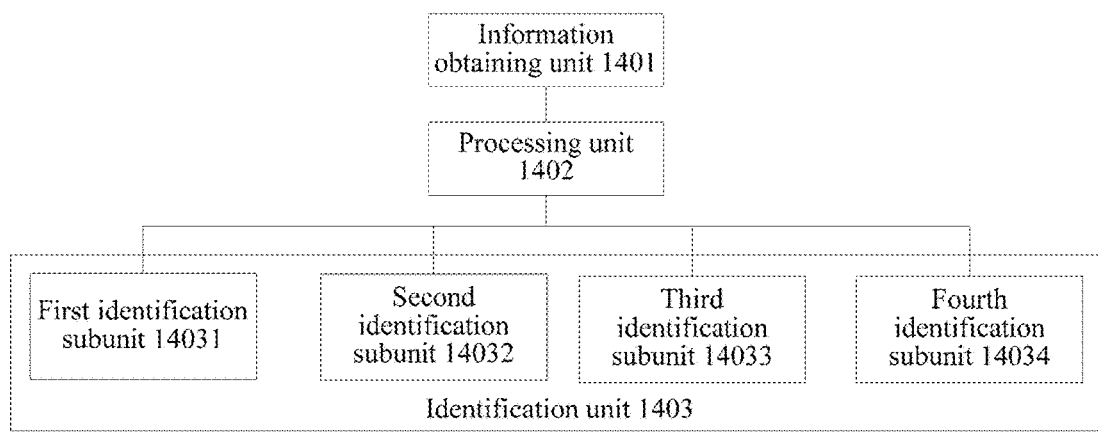
FIG. 14 is a schematic structural composition diagram 4 of a server according to an embodiment of the present disclosure.

This embodiment of the present disclosure provides a server. As shown in FIG. 14, the server includes:

an information obtaining unit 1401, configured to obtain network connection information of a terminal device, the network connection information including at least identifier information of the terminal device and identifier information of a respective wireless AP to which the terminal device connects;

a processing unit 1402, configured to: obtain corresponding network connection information based on the identifier information of the terminal device, to determine a first number of times of connections between the terminal device and the wireless AP to which the terminal device connects; and obtain corresponding network connection information based on the identifier information of the wireless AP, to determine a second number of times of connections between the wireless AP and each terminal device connecting to the wireless AP; and an identification unit 1403, configured to identify a first-type wireless AP based on the first number of times of connections and/or the second number of times of connections.

Herein, the terminal device and the wireless AP to which the terminal device connects in the network connection information are both identified by using the identifier information. Specifically, the identifier information of the terminal device may be an IMEI of the terminal device. The identifier information of the wireless AP may include an SSID and a BSSID. In addition, each terminal device may initiate at least one piece of network connection information. Each piece of network connection information may be network connection information that is generated and sent by a terminal device when the terminal device connects to different wireless APs at different times.

A manner for obtaining network connection information may be regularly sending the network connection information by the terminal device or may be periodically obtaining the network connection information by the server. The obtaining the network connection information may be obtaining the network connection information from a WiFi connection log stored on a side of the terminal device.

In this embodiment, the corresponding network connection information is obtained based on the identifier information of the terminal device, to obtain the first number of times of connections between the terminal device and each wireless AP to which the terminal device connects. The processing unit 1402 is specifically configured to: obtain identifier information of at least one terminal device from network connection information sent by the at least one terminal device; extract a terminal device one by one as a first terminal device; obtain at least one piece of network connection information corresponding to the first terminal device; collect statistics on identifier information of a wireless AP to which the first terminal device connects from the at least one piece of network connection information; and collect statistics on a number of times that the first terminal device connects to each wireless AP, to determine a first number of times of connections between the first terminal device and at least one wireless AP.

In addition, the processing unit 1402 is specifically configured to: obtain identifier information of at least one wireless AP from the network connection information sent by the at least one terminal device; extract a wireless AP one by one as a first wireless AP; obtain at least one piece of network connection information including the first wireless AP; collect statistics on at least one terminal device connecting to the first wireless AP from the at least one piece of network connection information, to determine a second number of times of connections between the first wireless AP and the at least one terminal device.

The network connection information further includes: a time period in which a terminal device establishes a connection to a wireless AP. The time period of establishing a connection may include at least a start moment and an end moment at which the terminal device establishes a connection to a wireless AP.

Correspondingly, the identification unit includes:

a fourth identification subunit 14034, configured to: determine, based on the first number of times of connections, a ranking of a first number of times of connections of at least one wireless AP to which the terminal device connects; determine, based on the second number of times of connections, a ranking of a second number of times of connections of at least one terminal device connecting to the wireless AP; select, based on the ranking of the first number of times of connections, N wireless APs whose rankings of numbers of times of connections to the terminal device are the highest; obtain rankings of reference numbers of times of connections to the terminal device from rankings of N second numbers, corresponding to the N wireless APs, of times of connections; select M wireless APs whose rankings of reference numbers of times of connections are the highest, where M is a positive integer greater than or equal to 1 and less than or equal to N; and set, as the first-type wireless AP based on the time period that is in the network connection information and in which the terminal device establishes a connection to the AP, a wireless AP of the M wireless APs that meets a second preset condition, where the second preset condition represents selecting a wireless AP to which a terminal device establishes a connection within a preset time period.

In addition, the identification unit may further include a first identification subunit 14031 and a second identification subunit 14032. The two identification subunits may separately identify a first-type wireless AP based on the first number of times of connections or the second number of times of connections. Specific functions are described in the foregoing embodiments, and are not described herein again. The identification unit may further include a third identification subunit 14033. The third identification subunit 14033 identifies the first-type wireless AP based on the two numbers of connection times but not based on the time period. Specific functions are described in the foregoing embodiments, and are not described herein again.

The preset time period may be a time period according to an actual situation. For example, the time period may be set to 8:00 p.m. to 8:00 a.m.

It can be seen that a first number of times of connections between a terminal device and a wireless AP and a second number of times of connections established between a wireless AP and a terminal device can be separately determined by means of the foregoing solution by using network connection information reported by the terminal device, and a first-type wireless AP is identified according to the first number of times of connections and the second number of times of connections. In this way, impact of a time rule can be avoided, and accuracy of identifying a first-type wireless AP is improved.

Figure 15:
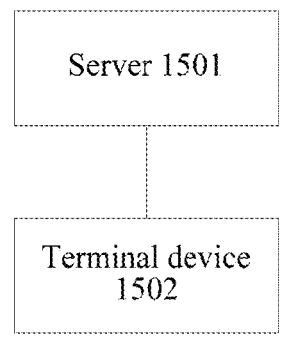
FIG. 15 is a schematic structural composition diagram of a system according to an embodiment of the present disclosure.

This embodiment of the present disclosure further provides a system for identifying a wireless AP. As shown in FIG. 15, the system includes:

a server 1501, configured to: obtain network connection information of a terminal device, the network connection information including at least identifier information of the terminal device and identifier information of a respective wireless AP to which the terminal device connects; obtain corresponding network connection information based on the identifier information of the terminal device, to determine a first number of times of connections between the terminal device and the wireless AP to which the terminal device connects; obtain corresponding network connection information based on the identifier information of the wireless AP, to determine a second number of times of connections between the wireless AP and each terminal device connecting to the wireless AP; and identify a first-type wireless AP based on the first number of times of connections and/or the second number of times of connections; and the terminal device 1502, configured to: establish a connection to the wireless AP; generate network connection information based on the identifier information of the terminal device and the identifier information of the wireless AP to which the terminal device connects; and send the network connection information to the server.

The functions of the server are the same as those of any one of the servers in Embodiment 4 to Embodiment 6, and are not described herein again.

Figure 16:
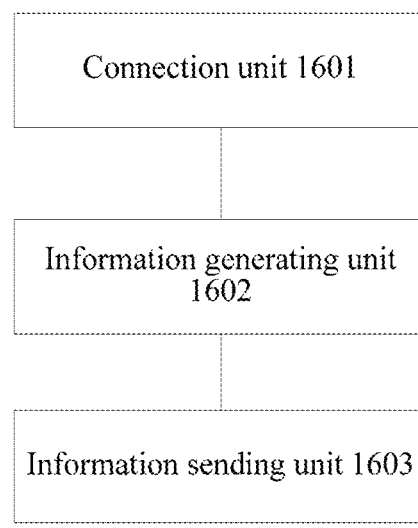
FIG. 16 is a schematic structural composition diagram of a terminal device according to an embodiment of the present disclosure.

The composition of the terminal device may be shown in FIG. 16, and includes:

a connection unit 1601, configured to establish a connection to a wireless AP;

an information generating unit 1602, configured to generate network connection information based on identifier information of the terminal device and identifier information of the wireless AP to which the terminal device connects; and an information sending unit 1603, configured to send the network connection information to the server, so that the server determines a connection relationship of terminal device dimensions and a connection relationship of wireless AP dimensions, and the server identifies a first-type wireless AP based on the connection relationship of the terminal device dimensions and/or the connection relationship of the wireless AP dimensions.

Herein, the terminal device and the wireless AP to which the terminal device connects in the network connection information are both identified by using the identifier information. Specifically, the identifier information of the terminal device may be an IMEI of the terminal device. The identifier information of the wireless AP may include an SSID and a BSSID. In addition, each terminal device may initiate at least one piece of network connection information. Each piece of network connection information may be network connection information that is generated and sent by a terminal device when the terminal device connects to different wireless APs at different times.

A manner for obtaining network connection information may be regularly sending the network connection information by the terminal device or may be periodically obtaining the network connection information by the server. The obtaining the network connection information may be obtaining the network connection information from a WiFi connection log stored on a side of the terminal device.

Preferably, the information generating unit 1602 is further configured to generate the network connection information by using a time period in which a terminal device establishes a connection to a wireless AP. The time period of establishing a connection may include at least a start moment and an end moment at which the terminal device establishes a connection to a wireless AP.

It can be seen that a first number of times of connections between a terminal device and a wireless AP and a second number of times of connections established between a wireless AP and a terminal device can be separately determined by means of the foregoing solution by using network connection information reported by the terminal device, and a first-type wireless AP is identified according to the first number of times of connections and the second number of times of connections. In this way, impact of a time rule can be avoided, and accuracy of identifying a first-type wireless AP is improved.

In the several embodiments provided in this application, it should be understood that the disclosed device and method may be implemented in other manners. The device embodiment described above is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between parts may be implemented through some interfaces, devices, or units. The indirect couplings or communication connections may be implemented in electronic, mechanical, or other forms.

The foregoing units described as separate components may be or may not be physically separated. Components shown as units may be or may not be physical units, that is, may be located at one place or distributed to a plurality of network units. Some or all of the modules may be selected to achieve the objective of the solutions of the embodiments according to actual demands.

In addition, functional units in the embodiments of the present disclosure may be all integrated into one processing module, or each of the units may exist alone physically, or two or more units are integrated into one unit. The integrated unit may be implemented in a form of hardware, or may be implemented in a form of hardware in addition to a software functional unit.

A person of ordinary skill in the art should understand that all or a part of the operations of the method according to the embodiments may be implemented by a program instructing relevant hardware. The program may be stored in a computer readable storage medium. When the program is run, the operations of the method according to the embodiments are performed. The storage medium may include various media capable of storing program code, such as a mobile storage device, a read-only memory (ROM), a random access memory (RAM), a magnetic disk, and an optical disc.

An embodiment of the present disclosure further provides a computer storage medium, storing computer executable instructions, the computer executable instructions being used to perform at least the following processing:

obtaining network connection information of a terminal device, the network connection information including at least identifier information of the terminal device and identifier information of a respective wireless AP to which the terminal device connects; analyzing corresponding network connection information based on the identifier information of the terminal device, to determine a first number of times of connections between the terminal device and the wireless AP to which the terminal device connects; analyzing corresponding network connection information based on the identifier information of the wireless AP, to determine a second number of times of connections between the wireless AP and each terminal device connecting to the wireless AP; and identifying a first-type wireless AP based on the first number of times of connections and/or the second number of times of connections.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for identifying a wireless access point (AP) performed at a computer server having one or more processors and memory storing one or more programs to be executed by the one or more processors, wherein the computer server is communicatively connected to a plurality of terminal devices, the method comprising:

obtaining, from the plurality of terminal devices, network connection information of the plurality of terminal devices, the network connection information comprising at least identifier information of each terminal device and identifier information of a respective wireless AP to which the terminal device connects;

for each of the plurality of terminal devices, determining a rank for each respective wireless AP to which the terminal device connects, further including:

analyzing corresponding network connection information based on the identifier information of the terminal device, to determine a first number of times of connections between the terminal device and the wireless AP to which the terminal device connects;

analyzing corresponding network connection information based on the identifier information of the wireless AP, to determine a second number of times of connections between the wireless AP and each terminal device connecting to the wireless AP; and determining the rank for the wireless AP based on a weighted average of the first number of times of connections between the terminal device and the wireless AP to which the terminal device connects and the second number of times of connections between the wireless AP and each terminal device connecting to the wireless AP; and returning identifier information of one or more wireless APs as a first-type wireless AP to which the terminal device connects and corresponding ranks to the terminal device.

2. The method according to claim 1, wherein the operation of returning identifier information of one or more wireless APs to which the terminal device connects and corresponding ranks to the terminal device further comprises:

receiving a wireless AP update request from the terminal device;

identifying one or more wireless APs to which the terminal device connects;

arranging the one or more wireless APs in an order in accordance with their respective ranks; and returning the identifier information of the one or more wireless APs as the first-type wireless AP and their associated order to the terminal device.

3. The method according to claim 1, wherein a wireless AP to which the terminal device establishes a maximum number of connections is selected as the first-type wireless AP corresponding to the terminal device.

4. The method according to claim 1, wherein a wireless AP to which the terminal device establishes a maximum amount of connection time is identified as the first-type wireless AP corresponding to the terminal device.

5. The method according to claim 1, further comprising:

obtaining, based on the second number of times of connections, quantity of terminal devices connecting to the wireless AP;

selecting a wireless AP meeting a first preset condition, wherein the first preset condition represents that the quantity of terminal devices connecting to the wireless AP is less than a first threshold; and selecting, from the wireless AP meeting the first preset condition as the first-type wireless AP, a wireless AP to which a single terminal device establishes a maximum number of connections.

6. The method according to claim 1, wherein a first-type wireless AP is selected by:

determining, based on the first number of times of connections, a ranking of a first number of times of connections of at least one wireless AP to which the terminal device connects; and determining, based on the second number of times of connections, a ranking of a second number of times of connections of at least one terminal device connecting to the wireless AP;

selecting, based on the ranking of the first number of times of connections, N wireless APs whose rankings of numbers of times of connections to the terminal device are the highest;

obtaining rankings of reference numbers of times of connections to the terminal device from rankings of N second numbers, corresponding to the N wireless APs, of times of connections; and selecting a wireless AP corresponding to a highest ranking of a reference number of times of connections as the first-type wireless AP.

7. The method according to claim 1, wherein the network connection information further comprises a time period in which a terminal device establishes a connection to a wireless AP.

8. The method according to claim 7, wherein a first-type wireless AP is selected by:

determining, based on the first number of times of connections, a ranking of a first number of times of connections of at least one wireless AP to which the terminal device connects; and determining, based on the second number of times of connections, a ranking of a second number of times of connections of at least one terminal device connecting to the wireless AP;

selecting, based on the ranking of the first number of times of connections, N wireless APs whose rankings of numbers of times of connections to the terminal device are the highest;

obtaining rankings of reference numbers of times of connections to the terminal device from rankings of N second numbers, corresponding to the N wireless APs, of times of connections; and selecting M wireless APs whose rankings of reference numbers of times of connections are the highest, wherein M is a positive integer greater than or equal to 1 and less than or equal to N; and setting, as the first-type wireless AP based on the time period that is in the network connection information and in which the terminal device establishes a connection to the AP, a wireless AP of the M wireless APs that meets a second preset condition, wherein the second preset condition represents selecting a wireless AP to which a terminal device establishes a connection within a preset time period.

9. A computer server communicatively connected to a plurality of terminal devices, the computer server comprising:

one or more processors;

memory; and one or more programs stored in the memory that, when executed by the one or more processors, cause the computer server to perform a plurality of operations including:

obtaining, from the plurality of terminal devices, network connection information of the plurality of terminal devices, the network connection information comprising at least identifier information of each terminal device and identifier information of a respective wireless AP to which the terminal device connects;

for each of the plurality of terminal devices, determining a rank for each respective wireless AP to which the terminal device connects, further including:

analyzing corresponding network connection information based on the identifier information of the terminal device, to determine a first number of times of connections between the terminal device and the wireless AP to which the terminal device connects;

analyzing corresponding network connection information based on the identifier information of the wireless AP, to determine a second number of times of connections between the wireless AP and each terminal device connecting to the wireless AP; and determining the rank for the wireless AP based on a weighted average of the first number of times of connections between the terminal device and the wireless AP to which the terminal device connects and the second number of times of connections between the wireless AP and each terminal device connecting to the wireless AP; and returning identifier information of one or more wireless APs as a first-type wireless AP to which the terminal device connects and corresponding ranks to the terminal device.

10. The computer server according to claim 9, wherein the operation of returning identifier information of one or more wireless APs to which the terminal device connects and corresponding ranks to the terminal device further comprises:
receiving a wireless AP update request from the terminal device;
identifying one or more wireless APs to which the terminal device connects;
arranging the one or more wireless APs in an order in accordance with their respective ranks; and
returning the identifier information of the one or more wireless APs as the first-type wireless AP and their associated order to the terminal device.

11. The computer server according to claim 9, wherein a wireless AP to which the terminal device establishes a maximum number of connections is selected as the first-type wireless AP corresponding to the terminal device.

12. The computer server according to claim 9, wherein a wireless AP to which the terminal device establishes a maximum amount of connection time is identified as the first-type wireless AP corresponding to the terminal device.

13. The computer server according to claim 9, wherein the plurality of operations further comprise:
obtaining, based on the second number of times of connections, quantity of terminal devices connecting to the wireless AP;
selecting a wireless AP meeting a first preset condition, wherein the first preset condition represents that the quantity of terminal devices connecting to the wireless AP is less than a first threshold; and
selecting, from the wireless AP meeting the first preset condition as the first-type wireless AP, a wireless AP to which a single terminal device establishes a maximum number of connections.

14. The computer server according to claim 9, wherein a first-type wireless AP is selected by:
determining, based on the first number of times of connections, a ranking of a first number of times of connections of at least one wireless AP to which the terminal device connects; and determining, based on the second number of times of connections, a ranking of a second number of times of connections of at least one terminal device connecting to the wireless AP;
selecting, based on the ranking of the first number of times of connections, N wireless APs whose rankings of numbers of times of connections to the terminal device are the highest;
obtaining rankings of reference numbers of times of connections to the terminal device from rankings of N second numbers, corresponding to the N wireless APs, of times of connections; and
selecting a wireless AP corresponding to a highest ranking of a reference number of times of connections as the first-type wireless AP.

15. The computer server according to claim 9, wherein the network connection information further comprises a time period in which a terminal device establishes a connection to a wireless AP.

16. The computer server according to claim 15, wherein a first-type wireless AP is selected by:
determining, based on the first number of times of connections, a ranking of a first number of times of connections of at least one wireless AP to which the terminal device connects; and determining, based on the second number of times of connections, a ranking of a second number of times of connections of at least one terminal device connecting to the wireless AP;
selecting, based on the ranking of the first number of times of connections, N wireless APs whose rankings of numbers of times of connections to the terminal device are the highest;
obtaining rankings of reference numbers of times of connections to the terminal device from rankings of N second numbers, corresponding to the N wireless APs, of times of connections; and
selecting M wireless APs whose rankings of reference numbers of times of connections are the highest, wherein M is a positive integer greater than or equal to 1 and less than or equal to N; and
setting, as the first-type wireless AP based on the time period that is in the network connection information and in which the terminal device establishes a connection to the AP, a wireless AP of the M wireless APs that meets a second preset condition, wherein the second preset condition represents selecting a wireless AP to which a terminal device establishes a connection within a preset time period.

17. A non-transitory computer readable storage medium, storing a plurality of computer executable instructions, the computer executable instructions being executed by one or more processors of a computer server that is communicatively connected to a plurality of terminal devices to perform a plurality of operations including:
obtaining, from the plurality of terminal devices, network connection information of the plurality of terminal devices, the network connection information comprising at least identifier information of each terminal device and identifier information of a respective wireless AP to which the terminal device connects;
for each of the plurality of terminal devices, determining a rank for each respective wireless AP to which the terminal device connects, further including:
analyzing corresponding network connection information based on the identifier information of the terminal device, to determine a first number of times of connections between the terminal device and the wireless AP to which the terminal device connects;
analyzing corresponding network connection information based on the identifier information of the wireless AP, to determine a second number of times of connections between the wireless AP and each terminal device connecting to the wireless AP; and
determining the rank for the wireless AP based on a weighted average of the first number of times of connections between the terminal device and the wireless AP to which the terminal device connects and the second number of times of connections between the wireless AP and each terminal device connecting to the wireless AP; and
returning identifier information of one or more wireless APs as a first-type wireless AP to which the terminal device connects and corresponding ranks to the terminal device.

18. The non-transitory computer readable storage medium according to claim 17, wherein the operation of returning identifier information of one or more wireless APs to which the terminal device connects and corresponding ranks to the terminal device further comprises:
receiving a wireless AP update request from the terminal device;
identifying one or more wireless APs to which the terminal device connects;

arranging the one or more wireless APs in an order in accordance with their respective ranks; and returning the identifier information of the one or more wireless APs as the first-type wireless AP and their associated order to the terminal device.

19. The non-transitory computer readable storage medium according to claim 17, wherein a wireless AP to which the terminal device establishes a maximum number of connections is selected as the first-type wireless AP corresponding to the terminal device.

20. The non-transitory computer readable storage medium according to claim 17, wherein a wireless AP to which the terminal device establishes a maximum amount of connection time is identified as the first-type wireless AP corresponding to the terminal device.

* * * * *